US011707682B2

(12) United States Patent
Benedetto et al.

(10) Patent No.: US 11,707,682 B2
(45) Date of Patent: Jul. 25, 2023

(54) NFT FRAMEWORK FOR TRANSFERRING AND USING DIGITAL ASSETS BETWEEN GAME PLATFORMS

(71) Applicant: Sony Interactive Entertainment Inc., Tokyo (JP)

(72) Inventors: Warren Benedetto, San Mateo, CA (US); Yiwei Yang, San Mateo, CA (US); Alvin Daniel, San Mateo, CA (US); Charles Denison, San Mateo, CA (US); Jonathan Webb, San Mateo, CA (US)

(73) Assignee: Sony Interactive Entertainment Inc., Tokyo (JP)

(*) Notice: Subject to any disclaimer, the term of this patent is extended or adjusted under 35 U.S.C. 154(b) by 0 days.

(21) Appl. No.: 17/472,625

(22) Filed: Sep. 11, 2021

(65) Prior Publication Data

US 2023/0079127 A1    Mar. 16, 2023

(51) Int. Cl.
   *A63F 13/00* (2014.01)
   *A63F 13/69* (2014.01)
   *G06Q 30/018* (2023.01)
   *A63F 13/58* (2014.01)
   *A63F 13/79* (2014.01)
   *A63F 13/812* (2014.01)
   *A63F 13/355* (2014.01)

(52) U.S. Cl.
   CPC ............ *A63F 13/69* (2014.09); *A63F 13/355* (2014.09); *A63F 13/58* (2014.09); *A63F 13/79* (2014.09); *A63F 13/812* (2014.09); *G06Q 30/018* (2013.01); *A63F 2300/538* (2013.01); *A63F 2300/5546* (2013.01); *A63F 2300/609* (2013.01); *A63F 2300/8011* (2013.01)

(58) Field of Classification Search
   CPC .................... G07F 17/3262; G07F 17/3272
   See application file for complete search history.

(56) References Cited

U.S. PATENT DOCUMENTS

2019/0130701 A1\*  5/2019  Simons ............... G07F 17/3251

OTHER PUBLICATIONS

"International Search Report and Written Opinion", dated Dec. 9, 2022, from PCT application PCT/US22/076251.

\* cited by examiner

*Primary Examiner* — David L Lewis
*Assistant Examiner* — Eric M Thomas
(74) *Attorney, Agent, or Firm* — John L. Rogitz (57) ABSTRACT

Systems and methods are disclosed for determining that a first end-user entity has performed a task within a computer simulation for which a non-fungible token (NFT) is to be provided, where the NFT is associated with a digital asset. Responsive to the determination, the NFT is provided to the first end-user entity so that the digital asset may be used, via the NFT, across plural different computer simulations and/or across plural different computer simulation platforms. Ownership of the NFT may also be subsequently transferred to other end-user entities for their own use across different simulations and/or platforms.

20 Claims, 5 Drawing Sheets

NFT FRAMEWORK FOR TRANSFERRING AND USING DIGITAL ASSETS BETWEEN GAME PLATFORMS

FIELD

The present application relates generally to NFT frameworks for transferring and using digital assets between game platforms.

BACKGROUND

As recognized herein, non-fungible tokens (NFT) are the digital world's version of physical collectables, such as but not limited to artwork. An NFT is a digital file in a block chain that proves who owns the underlying digital asset, much as a sales receipt proves ownership of a physical painting, although forging NFT proof-of-ownership is nearly impossible owing to the use of block chain technology. Like a print or painting, ownership of an NFT does not necessarily include copyright in the original work, which copyright may be retained by the creator. While anyone can view the digital asset, only the person identified in the NFT can sell the ownership of the asset, which then is recorded in the block chain. Thus, digital assets can be bought and sold like physical collectables through NFT transactions.

SUMMARY

As recognized herein, in some applications such as computer/video games, an NFT might represent the artwork or an asset in the game (such as a character or weapon or other game asset), but current systems are technologically inadequate for the owner to use the asset across different games and/or platforms. Accordingly, as further recognized herein, the functionality of the game may be enhanced by enabling gamers and/or spectators to exclusively use the asset and possibly transfer its rights to others via NFT as described further below.

Accordingly, in one aspect a system includes at least one computer medium that is not a transitory signal and that includes instructions executable by at least one processor to determine that a first end-user entity has performed a task for which a first non-fungible token (NFT) is to be provided. The task is performed within at least one computer simulation, and the first NFT represents a digital asset. The instructions are also executable to, responsive to the determination, provide the first NFT to the first end-user entity and prevent other end-user entities engaging in other instances of the at least one computer simulation from being provided another NFT for performing the task again subsequent to the first end-user entity performing the task.

In some examples, the first end-user entity may include plural end-users that act in concert to perform the task. In other examples, the first end-user entity may include a single end-user and no other end-users.

In various example implementations, the task may include locating the digital asset within the at least one computer simulation, and/or beating or overcoming a particular aspect of the at least one computer simulation.

Additionally, in example embodiments the digital asset itself may include a video game skin, video game artwork, an avatar, a video game weapon, and/or a video game skill.

Still further, if desired the instructions may be executable to provide the digital asset to the first end-user entity and/or maintain the digital asset according to a pointer indicated in the first NFT. In these examples, the digital asset may be provided and/or maintained in a standardized format. The standardized format may be readable to insert the digital asset in different computer simulations that may include different video games of different titles. Additionally, or alternatively, the standardized format may be readable via different video game platforms such as, for example, PlayStation and Xbox. The digital asset may be usable by the first end-user entity across different video game platforms based on the first end-user entity's ownership of the first NFT.

Also in example implementations, the instructions may be executable to prevent other end-user entities engaging in other instances of the at least one computer simulation from being provided another NFT for performing the task again by removing the digital asset from a virtual location at which the digital asset would otherwise exist in other instances of the computer simulation that are executed. Preventing others may also include preventing performance of the task again in other instances of the computer simulation that are executed, and/or declining to provide additional NFTs for subsequent additional performances of the task.

In some examples, the NFT can be used cross-generationally (e.g., from PS4 to PS5).

In another aspect, a method includes determining that a first end-user entity has performed a task for which a non-fungible token (NFT) is to be provided. The task is performed within a first computer simulation and the NFT is associated with a digital asset. The method also includes providing the NFT to the first end-user entity responsive to the determining, with the NFT indicating use rights of the digital asset by the first end-user entity. The digital asset is then usable via the NFT by the first end-user entity across plural different computer simulations and/or across plural different computer simulation platforms.

Accordingly, in some examples the NFT may be a first NFT and the method may include, responsive to the determining, preventing other end-user entities engaging in other instances of the at least one computer simulation from being provided another NFT for performing the task again subsequent to the first end-user entity performing the task.

Also in various example implementations, the task may include being the first to locate a representation of the digital asset within the at least one computer simulation and/or being the first across all instances of execution of the at least one computer simulation to take a particular action within the at least one computer simulation. The at least one computer simulation itself may include a cloud-based video game.

Still further, if desired the method may include receiving a request from a second end-user entity to use the digital asset in at least one computer simulation, where the second end-user entity may be different from the first end-user entity. In these examples, the method may then include verifying via the NFT that the second end-user entity currently holds the use rights for the digital asset responsive to receiving the request and then permitting use by the second end-user entity of the digital asset in at least one computer simulation responsive to the verifying.

In still another aspect, a system includes at least one computer medium that is not a transitory signal and that includes instructions executable by at least one processor to determine that a first end-user entity has performed a task for which a non-fungible token (NFT) is to be provided. The task is performed within a first computer simulation and the NFT is associated with a digital asset. The instructions are also executable to provide the NFT to the first end-user entity responsive to the determination. The NFT indicates use rights of the digital asset by the first end-user entity, and the digital asset is usable via the NFT by the first end-user entity across plural different computer simulations and/or across plural different computer simulation platforms.

In some example embodiments, the task may include a victory in an e-sports tournament and the digital asset may be usable via the NFT by the first end-user entity across plural different computer simulations. The plural different computer simulations may include different annual versions of a particular video game title, different video games of different game genres, and/or different execution instances of the same video game.

The details of the present application, both as to its structure and operation, can be best understood in reference to the accompanying drawings, in which like reference numerals refer to like parts, and in which:

DETAILED DESCRIPTION

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may be used that may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or gamer network to network members.

A processor may be a single- or multi-chip processor that can execute logic by means of various lines such as address lines, data lines, and control lines and registers and shift registers.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). The AVD 12 alternatively may also be a computerized Internet enabled ("smart") telephone, a tablet computer, a notebook computer, a head-mounted device (HMD) and/or headset such as smart glasses or a VR headset, another wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Figure 1:
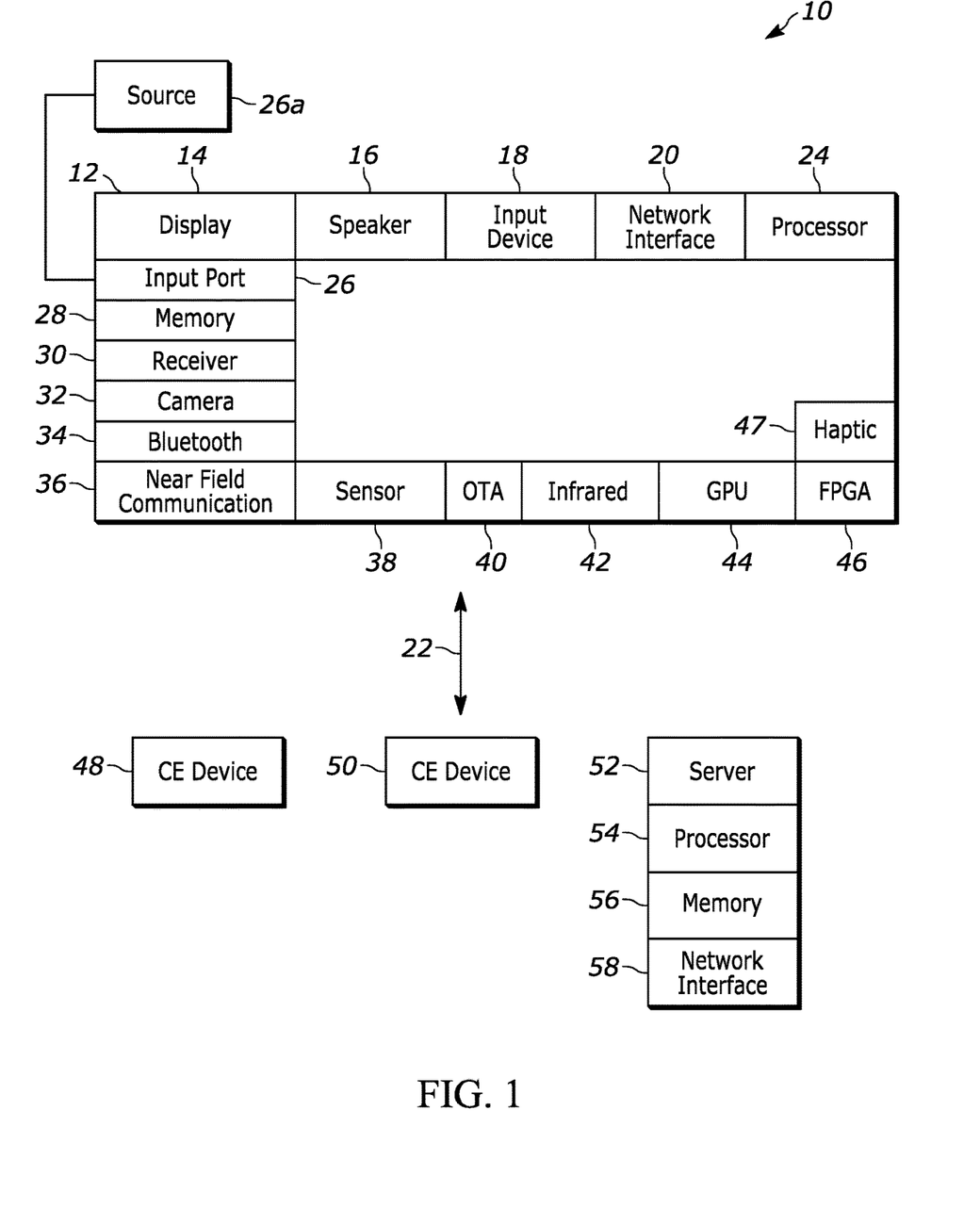
FIG. 1 is a block diagram of an example system consistent with present principles.

Accordingly, to undertake such principles the AVD 12 can be established by some, or all of the components shown in FIG. 1. For example, the AVD 12 can include one or more touch-enabled displays 14 that may be implemented by a high definition or ultra-high definition "4K" or higher flat screen. The touch-enabled display(s) 14 may include, for example, a capacitive or resistive touch sensing layer with a grid of electrodes for touch sensing consistent with present principles.

The AVD 12 may also include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a universal serial bus (USB) port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 48.

The AVD 12 may further include one or more computer memories/computer-readable storage mediums 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24. The component 30 may also be implemented by an inertial measurement unit (IMU) that typically includes a combination of accelerometers, gyroscopes, and magnetometers to determine the location and orientation of the AVD 12 in three dimension or by an event-based sensors.

Continuing the description of the AVD 12, in some embodiments the AVD 12 may include one or more cameras 32 that may be a thermal imaging camera, a digital camera such as a webcam, an event-based sensor, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 that provide input to the processor 24 (e.g., a pressure sensor, additional motion sensors such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command)). For example, one or more of the auxiliary sensors 38 may include one or more pressure sensors forming a layer of the touch-enabled display 14 itself and may be, without limitation, piezoelectric pressure sensors, capacitive pressure sensors, piezoresistive strain gauges, optical pressure sensors, electromagnetic pressure sensors, etc.

The AVD 12 may also include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array (FPGA) 46 also may be included. One or more haptics/vibration generators 47 may be provided for generating tactile signals that can be sensed by a person holding or in contact with the device. The haptics generators 47 may thus vibrate all or part of the AVD 12 using an electric motor connected to an off-center and/or off-balanced weight via the motor's rotatable shaft so that the shaft may rotate under control of the motor (which in turn may be controlled by a processor such as the processor 24) to create vibration of various frequencies and/or amplitudes as well as force simulations in various directions.

Still referring to FIG. 1, in addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. The HMD may include a heads-up transparent or non-transparent display for respectively presenting AR/MR content or VR content.

In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other devices of FIG. 1 over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown in FIG. 1 or nearby.

The components shown in the following figures may include some or all components shown in FIG. 1. The user interfaces (UI) described herein may be consolidated and/or expanded, and UI elements may be mixed and matched between UIs.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Support vector machines (SVM) and Bayesian networks also may be considered to be examples of machine learning models.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that that are configured and weighted to make inferences about an appropriate output.

Figure 2:
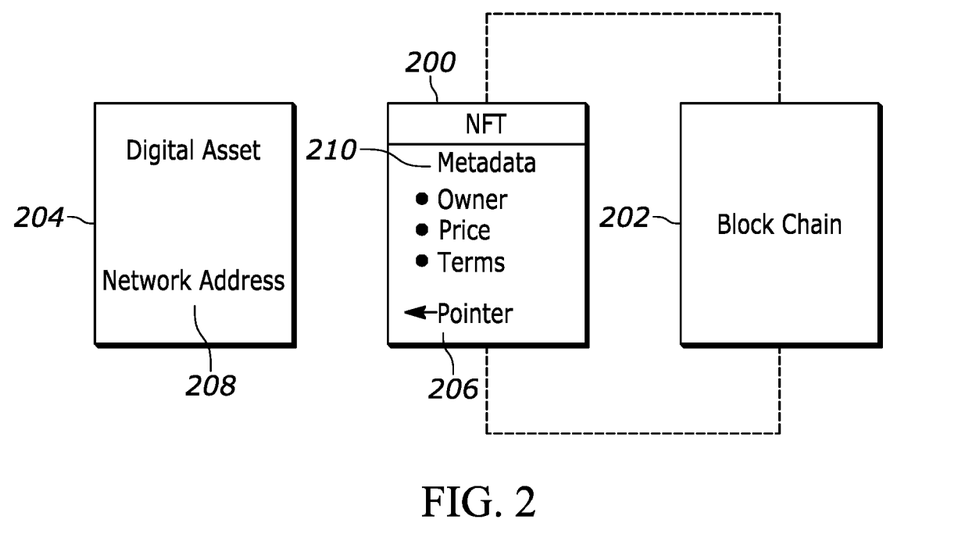
FIG. 2 schematically illustrates an NFT consistent with present principles.

FIG. 2 illustrates a data structure 200 configured for inclusion in a block chain 202. The data structure 200 in the embodiment shown is configured as a non-fungible token (NFT) that relates to or is derived from a digital asset 204, such as an image, an audio recording, an avatar, a video game weapon, a replay video of a game event played by the user, a visual collector's version cover of game, special artwork for the game, or other digitally-embodied asset that might be generated or composed by an artist or other content creator or game developer. Other example digital assets will be discussed further below. For example, in certain implementations the digital asset 204 may be from a computer simulation such as but not limited to a computer game, and may represent a game character, weapon, skin, or other aspect of the computer game.

In some cases, the digital asset 204 may be encoded as part of the data structure 200 (hereinafter for brevity, "NFT 200") for inclusion into the block chain 200 or may be stored separately from the NFT 200 per se, in which case the NFT 200 may include a pointer 206 to a network address 208 of the digital asset 204.

The NFT 200 typically includes metadata 210 indicating ownership and/or use rights of the NFT 200 and hence of the digital asset 204. The metadata may include indication of the current and if desired past owners of the NFT 200, the price(s) paid for the ownership or other means by which ownership was acquired, the terms of the ownership (e.g., whether copyright does or does not accompany ownership), length of ownership, whether ownership can be transferred, etc.

Figure 3:
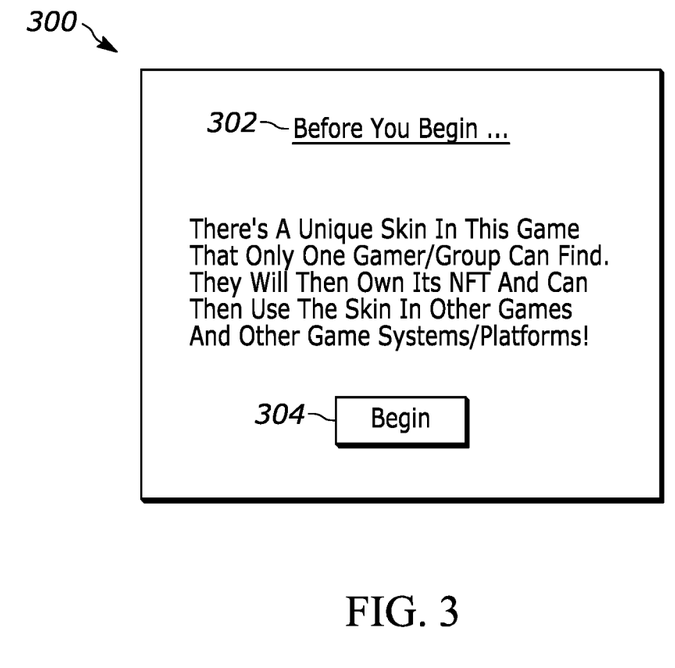
FIG. 3 illustrates example graphical user interface (GUI) that may be presented to indicate a task to perform within a computer simulation to be awarded an NFT for an associated digital asset consistent with present principles.

Now in reference to FIG. 3, suppose an end-user has acquired a new video game on its day of release and has installed it on his/her local console to play it. Alternatively, suppose an end-user has been provided access to play a new cloud-based video game on the day of its release even if not installed on a local console. In either case, prior to execution of the game or as an initial presentation during game execution, a graphical user interface (GUI) 300 may be presented on the end user's local display, such as a mobile device display or TV connected to the user's own console.

As shown in FIG. 3, the GUI 300 may include a prompt 302 indicating that a unique skin (the digital asset in this example) has been placed at a virtual location within the video game's virtual world. The skin itself may be established by, e.g., avatar garments and/or skin patterns of a particular appearance. In some examples, the prompt 302 may also indicate that only one end-user entity can find and own the NFT for the skin itself. The end-user entity might be the single end-user or gamer, or plural end-users on a team that are acting in concert to jointly perform a task as might be the case in an electronic-sports (e-sports) video game for instance. As also shown in FIG. 3, the prompt 302 might further indicate that only the acquiring end-user entity may use the skin, whether in the same video game, in different video games on the same platform (e.g., PlayStation, Nintendo, or Xbox), or even in different video games on different platforms. The GUI 300 may also include a selector 304 that may be selectable via touch, cursor, or button input to begin the first level or stage of the game itself after the prompt 302 is read.

Next suppose the end-user entity from above is the first entity/user to actually find the skin at its designated virtual location within the video game's virtual world. In this context, being the first one may mean the first entity to have found the skin among any and all instances of execution of the same game across multiple different consoles/devices (e.g., after the game's public release), any and all platforms that execute the game, and/or any and all users that have played the game as located anywhere in the world. Based on being the first entity, the GUI 400 of FIG. 4 may then be presented on the entity's local display.

Figure 4:
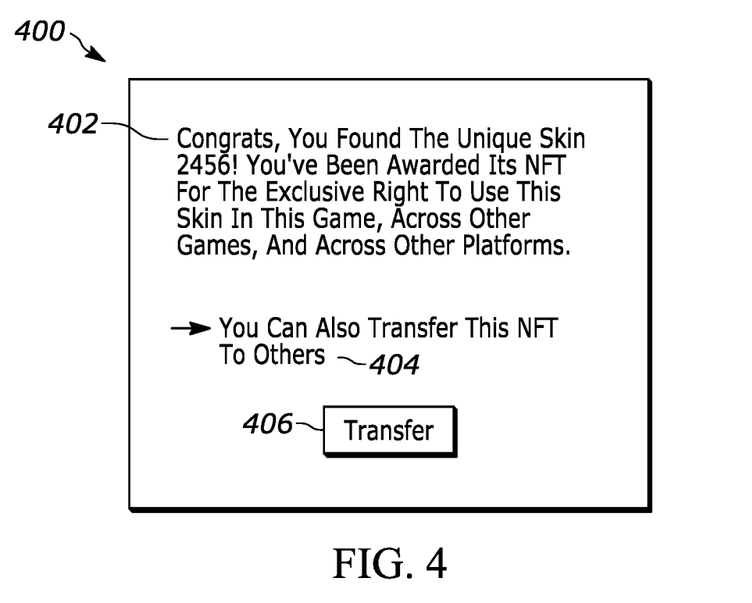
FIGS. 4 and 5 show example GUIs indicating that a particular task has been completed and associated NFT awarded consistent with present principles.

As shown in FIG. 4, the GUI 400 may include a prompt 402 congratulating the entity and indicating the asset identity (ID) and/or name of skin that was found. The prompt 402 may also indicate that the entity has been awarded the associated NFT for the skin, which may provide the entity with the exclusive right to use that skin in the game in which it was found, in other video games (e.g., same game but different annual version, different games of different titles, different game genres, etc.), and on other gaming platforms.

The GUI 400 might also include an indication 404 that the NFT for the skin that was found can be transferred to others (e.g., sold to others for value or exchanged). If the user wishes to do so, then he or she may select the selector 406 to initiate an NFT transfer process through an electronic NFT exchange to list the NFT for sale or otherwise transfer it to another entity. The NFT exchange might be a public exchange hosted by the video game developer's servers, the servers of the video game platform currently being used, and/or the servers of a third-party entity hosting its own NFT exchange, for example.

Figure 5:
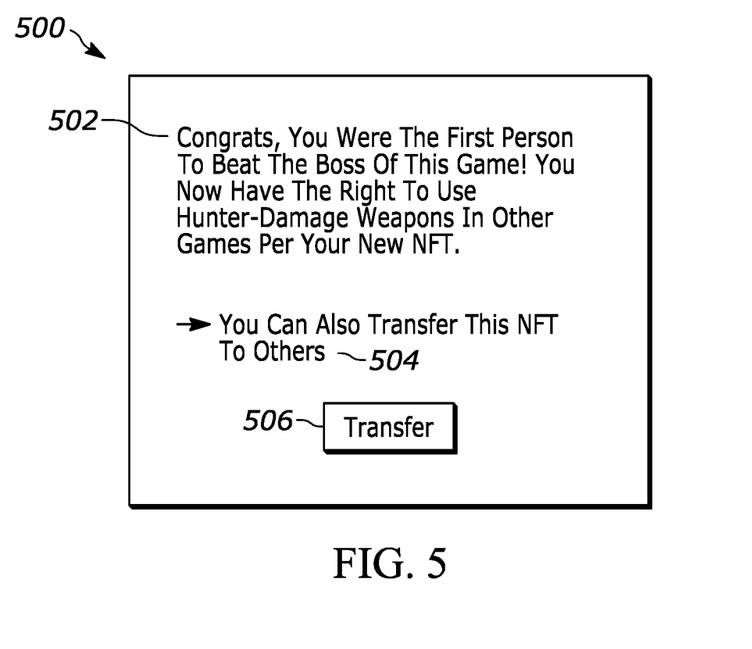

FIG. 5 shows another example GUI 500 that may be presented on a display, but in the context of an entity beating a boss of a video game rather than finding a skin somewhere in the game's virtual world. Here, assume the end-user entity is a single person that is the first one to have beaten the game's boss (e.g., across all instances of the game that have been executed so far across all consoles/devices). A prompt 502 presented on the GUI 500 may indicate as much and may also indicate that the underlying digital asset of the NFT that has been acquired is the video game skill of expert-level hunter-damage weapon use (alternatively, the weapon property of hunter damage). As the prompt 502 also indicates, this skill can be used in other video games of different titles using the NFT that the person has won. So, for example, if one game applies the expert-level hunter-damage skill to use of swords and another game applies the expert-level hunter-damage skill to use of firearms, the NFT may be used to use the skill according to the respective applicable weapon type of the respective game itself. The GUI 500 might also include an indication 504 that the NFT for the skill that was won can be transferred to others, and if the user wishes to do so then he or she may select the selector 506 to initiate an NFT transfer process through an electronic NFT exchange to list the NFT for sale or otherwise transfer it to another entity.

Figure 6:
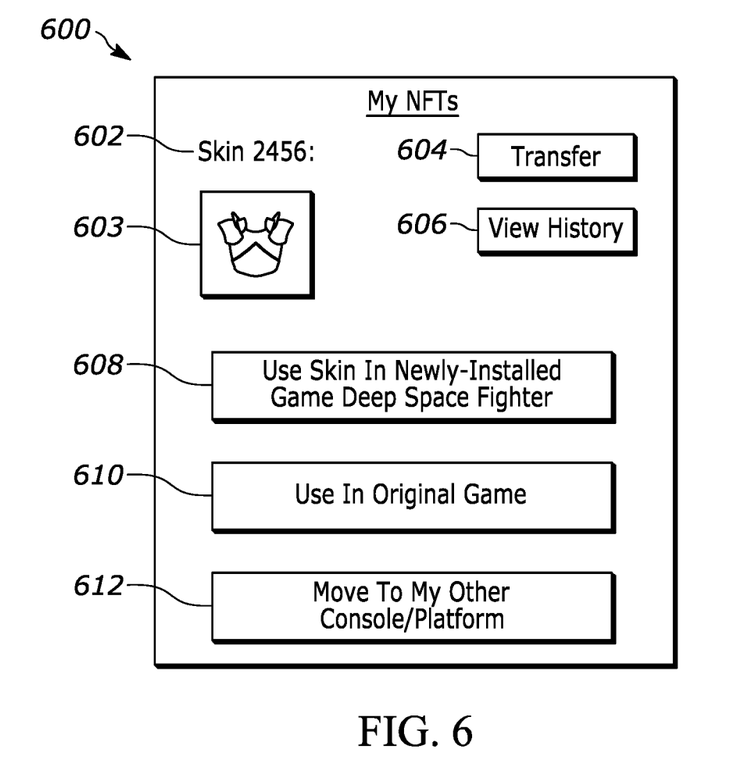
FIG. 6 shows an example GUI that lists a particular user's NFTs as won through gameplay and that provides for the ability to transfer or use the associated digital asset itself consistent with present principles.

Now in reference to FIG. 6, suppose a user/entity wished to view NFTs which they have acquired through prior gameplay consistent with present principles. To do so, the entity might navigate a home menu of their console or access an NFT repository menu to reach the GUI 600 of FIG. 6. As shown, the GUI 600 may include a listing 602 of one or more NFTs which the entity has acquired, possibly along with metadata and other information from the respective NFT's smart contract. In the present example, only one NFT is shown for the skin described above in reference to FIGS. 3 and 4, though it is to be further understood that other NFTs and associated information might also be presented in the list 602.

In any case, as shown the list entry for the entity's skin (skin ID 2456 in this example) may include a thumbnail image 603 of the digital asset itself as well as other information if desired. The list entry may also include a selector 604 that may be selectable for the entity to transfer the skin to someone else through an exchange as set forth above. The list entry might also include a selector 606 that may be selectable to view a history of the NFT, including how the NFT was acquired by the current rights holder and from whom, the NFT's overall ownership chain, which particular game task was performed to initially win the NFT, etc., as might be indicated in the NFT's metadata.

Additionally, the GUI 600 may also present a selector 608 that may be selectable to command the game system to use or load the digital asset associated with the NFT (skin 2456 in this case) into a game called Deep Space Fighter, as newly installed on the entity's console. Thus, it is to be understood that this game is not the same game in which the skin was initially virtually located and found.

However, if desired the user may select the selector 610 to instead provide a command to use or load the digital asset into the original game in which it was located and found. Similar selectors may also be presented to use or load the skin into other games available to the entity.

Additionally, if desired in some examples the GUI 600 may include a selector 612 that may be selectable to initiate a transfer of the NFT from a user account for the entity on one video game platform (e.g., PlayStation) to a different but linked user account associated with the same entity but for another video game platform (e.g., Xbox).

Figure 7:
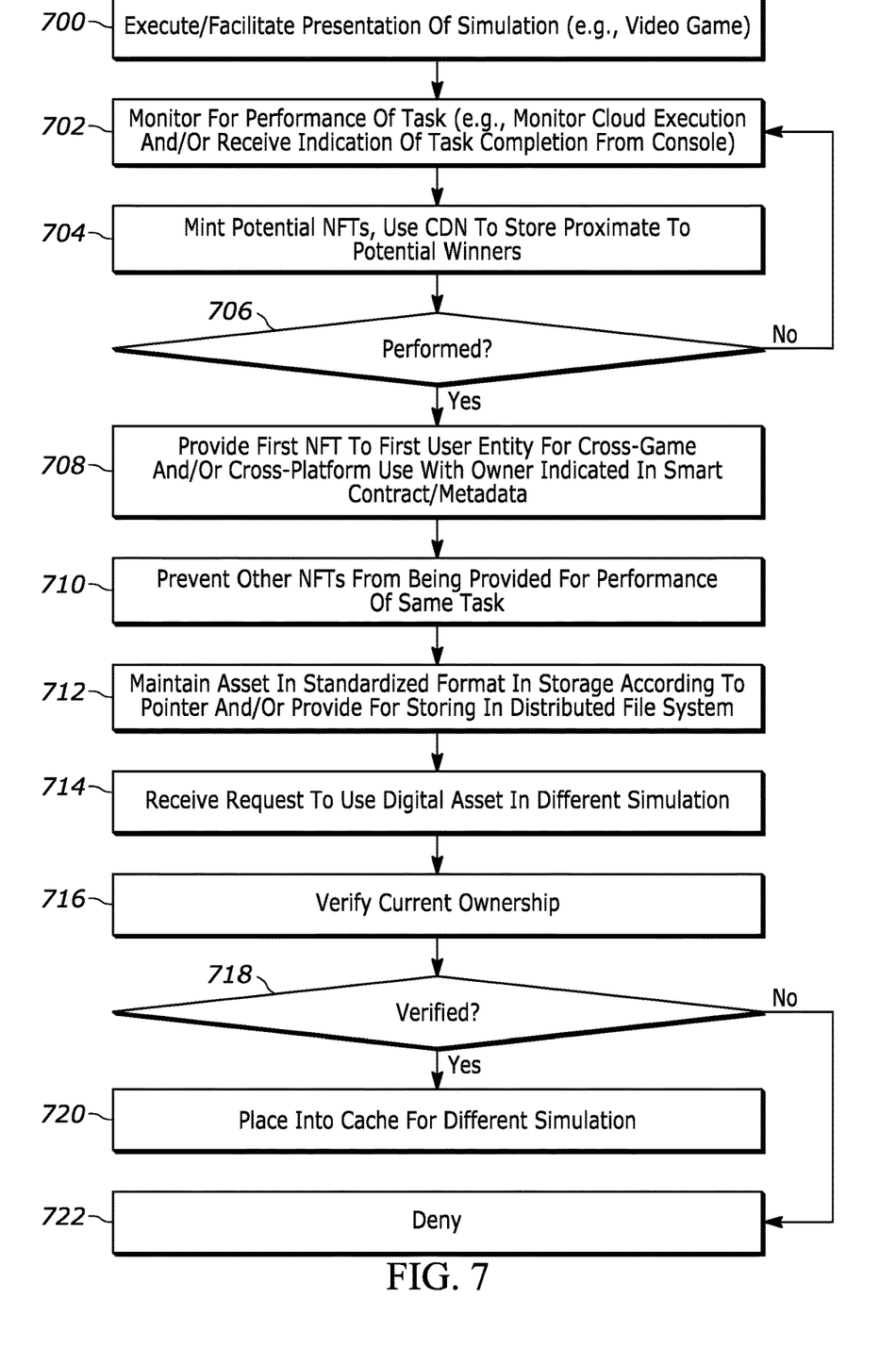
FIG. 7 illustrates example logic in example flow chart format that may be executed by a device consistent with present principles.

Continuing the detailed description in reference to FIG. 7, it shows a flow chart illustrating example logic that may be executed by one or more devices in any appropriate combination consistent with present principles. For example, the logic may be executed by a mobile device, a particular user's video game console, a server in communication with the mobile device or console, and/or a cloud-based gaming system consistent with present principles.

Beginning at block 700, the device may begin executing or otherwise facilitating presentation of a computer simulation such as a video game or even a virtual reality (VR) or augmented reality (AR) presentation. From block 700 the logic may proceed to block 702 where the device may, during game execution, monitor for performance and/or completion of a predefined task (e.g., as defined by the game developer or console manufacturer) for which an NFT is to be provided as described herein.

For example, at block 702 the device may monitor cloud or console execution of one instance of the game's execution, or even monitor multiple different instances of the same video game as played by different players at different real-world locations. Additionally, or alternatively, at block 702 the device may receive an indication of partial or full completion of the task from another device facilitating game execution (e.g., receive a message at a server from a user's local console that reports that the task has been performed or is in the process of being performed, as monitored by the local console itself). Thus, note here that block 702 may be executed to monitor not just a single end-user entity's gameplay but possibly to monitor multiple entities' gameplay as occurring in parallel across multiple execution instances of the same game as happening concurrently. From block 702 the logic may then proceed to block 704.

At block 704 the logic may, even if the task has not yet been fully completed, mint plural potential NFTs (only one of which may ultimately be provided) to save processing time down the line and reduce minting latency that might otherwise occur if minting were not done until after one entity actually completes the task. Thus, multiple potential NFTs may be minted in advance so that one of those NFTs can ultimately be provided to the eventual winner of the NFT (first to perform the task) immediately after the task is fully completed by that entity.

Also, at block 704 and to also reduce latency in providing an NFT to an eventual winner, once minted each potential NFT (and possibly the associated digital asset itself) may be routed through a content delivery network (CDN) to a nearest available datacenter corresponding to each potential winner's current geolocation and/or preferred platform. Additionally, or alternatively, a predicted future location may be inferred through machine learning of the respective potential winner's past travel habits and/or analysis of their electronic calendar to place the NFT and possibly the associated digital asset itself at a datacenter that is most proximate to the predicted future geolocation. The CDN may be hosted and/or maintained by a particular console manufacturer or by a third party, further example. Further note here that similar content delivery techniques may be used to place the NFT and digital asset near a subsequent transferee (e.g., upon transfer by the initial entity that won the NFT).

In any case, still in the context of minting multiple potential NFTs, it is to be understood consistent with present principles that multiple end-user entities (e.g., multiple individual end-users) might be playing different instances of the same game at the same time, such as on its day of release, and might all be trying to perform the same task which only one of them will ultimately complete first to win the associated NFT. A certain task partial-completion threshold may therefore be established by the game's developer or console manufacturer, with the threshold intended to narrow the number of entities that are likely to win the NFT to a relatively small number for which the potential NFTs may then be minted more efficiently. In other words, once each entity passes the threshold, the system may begin minting a potential NFT for that entity as if that entity had already completed the task itself and won the corresponding NFT since passing the threshold signifies a higher likelihood of that entity completing the task than others who have not crossed the threshold yet. For example, the threshold might be reaching a certain level of the game where the associated digital asset itself is virtually located or reducing a certain video game boss's health that is to be beat to below fifty percent during a battle (with the finding of the digital asset or the ultimate killing of the boss establishing task completion in this example).

Additionally, or alternatively, pre-launch of the game publicly or at another time, the developer or console manufacture may train a machine learning model to predict whom among a larger group of players will place in the top ten (or another threshold number) that are most likely to complete the task before others. To this end, different gameplay samples (e.g., different game video clips and/or different controller inputs from different players) may be fed into the model during training along with respective ground truth classifications for the model to learn different moves, tactics, playstyles, and other metrics that most-quickly result in task completion. After training, in operation the model may be used to infer, from real time samples, which players that have begun playing the game are in the top-ten for most-likely to complete the task. Thus, the model may be formed at least in part by a recurrent neural network and/or convolutional neural network that is trained according to the training techniques described above (e.g., supervised learning).

From block 704 the logic may then move to decision diamond 706 where the device may actually determine whether the task has been performed or completed by a certain entity (the first entity to do so). A negative determination may cause the logic to revert back to block 702 and proceed again therefrom, while an affirmative determination may instead result in the logic proceeding to block 708.

At block 708 the device may provide the first NFT to the first end-user entity to perform the task so that the NFT and/or underlying digital asset can be used across multiple different games and platforms as described herein. For example, the first NFT may be encrypted and sent over the open Internet or the CDN from above to the winning entity's client device or its remotely-located personal NFT repository. The winning user entity may also be indicated in the first NFT's smart contract or other metadata as the initial awardee or initial transferee of the first NFT. From block 708 the logic may then proceed to block 710.

At block 710, in certain examples the device may prevent other, additional NFTs beyond the first NFT from being provided to other entities for performance or completion of the same task (but subsequent to the winning entity's completion of the task). Prevention may occur multiple different ways. For example, prevention may include removing the digital asset, through involuntary game updates, from a virtual location at which the digital asset would otherwise exist or be loaded in other instances of the video game that are subsequently executed. The asset's file may also be removed altogether from cloud-based storage in a cloud gaming environment or may be deleted from a respective console's storage through commands or game updates pushed to the individual consoles that have already installed a respective copy of the game.

Prevention may additionally or alternatively include preventing performance of the same task again in other instances of the computer simulation that are subsequently executed. For example, the device may remove from the game, through game updates pushed to each console involuntarily, the skill/ability to kill a particular video game "bad guy" a certain way so that no one else even has the opportunity to beat that same "bad guy" in the same way with the same skill. Other "moves" or available button combinations may also be removed through involuntary game updates. Prevention may also include declining to provide additional NFTs for subsequent additional performances of the same task (e.g., simply declining to do so, or removing the first NFT from a list of available NFTs/digital assets that can be won).

Still in reference to FIG. 7, from block 710 the logic may then move to block 712. At block 712 the device may maintain the digital asset itself that is represented by the first NFT in remote storage at a storage location indicated by the first NFT's pointer (e.g., at a server). Note here that the digital asset (and even first NFT itself) may be created and maintained in an agreed-upon standardized or unified file format for cross-compatibility across multiple different games and multiple different platforms/consoles (from different manufacturers) so that the asset is usable/readable across different games and platforms.

Additionally, or alternatively, but also at block 712, the device may provide the associated digital asset itself (still in standardized format) to the first end-user entity that won it for eventual placement into a distributed file system/network. Additionally, or alternatively, the device executing block 712 may digitally sign and place the asset in the distributed file system itself. The distributed file system may be used to help prevent "link rot" that might otherwise occur, where the digital asset might be moved or deleted at a later time from a storage location indicated by the first NFT's pointer and in essence result in the pointer and potentially the first NFT itself being de facto invalid at that point since the first NFT would no longer indicate the current location of the associated digital asset and hence be of little use or value.

Thus, at block 712 certain parts of the underlying file establishing the digital asset itself may be broken up into smaller pieces (e.g., with each having an equal number of bits and/or each being no more than a threshold number of bits). The pieces may then be distributed to other client devices over a network for storage at those devices, such as one or more client devices that might already be performing NFT validation and other blockchain mining and validation functions. The different parts may even be encrypted with the winning device's or winning end-user entity's own public encryption key (according to an asymmetric encryption scheme) so that many other client devices might be able to store the encrypted file parts themselves but only the winning end-user entity would be able decrypt the file parts with its own private key after accessing them from one or more distributed locations to then make use of the decrypted file parts.

Specifically, each file part may be tagged in its own file metadata with a unique identifier for the respective file part, and that unique identifier may also be included in the first NFT's smart contract or other metadata so the file part may be identified later from any number of different devices that might concurrently currently store the respective part in the distributed system. The smart contract or other metadata may also include executable instructions for the owning user's device to reassemble the digital asset into a complete file or original version from the decrypted, distributed parts using the identifiers. Thus, the first NFT may not be subject to link rot through the distributed system, and the owning entity may be able to access the underlying digital asset that is owned via the first NFT regardless of whether any given file location disappears or is taken offline. In some examples, the digital asset may even be "pinned" within the distributed system, where its metadata indicates that it should be maintained in the system and not purged or deleted.

From block 712 the logic may proceed to block 714. At block 714 the device may receive a request to use the digital asset represented by the first NFT in a different simulation, such as a different video game of a different genre. For instance, if the first NFT was won through a role-playing game called "Evil Emperor Dynasty", at block 714 a request might be received for insertion of the associated asset into and/or use in an e-sports basketball game.

Responsive to receiving the request at block 714, the logic may move to block 716 where the device may attempt to verify current ownership of the first NFT via the first NFT's blockchain distributed ledger. Note here that the request received at block 714 may be from the first end-user entity (the one that initially performed the associated task first to initially win the first NFT) or may be from another end-user entity that acquired the first NFT at a later time from the first end-user entity or even an intervening entity that owned it. The first NFT's blockchain ledger may memorialize all these changes in ownership as they occur for the device to ultimately attempt to verify current ownership at block 716.

From block 716 the logic may then move to decision diamond 718 where the logic may determine whether the end-user entity from which the request was received at block 714 is the actual current owner of the first NFT as memorialized in the NFT's own blockchain ledger and hence currently holds the use rights to the digital asset itself. To this end, blockchain consensus algorithms such as proof of work and proof of stake may be used to validate the current owner through consensus.

A negative determination at diamond 718 may cause the logic to move to block 722 where the request may be denied and thus the digital asset is not used as requested. However, an affirmative determination at diamond 718 may instead cause the logic to proceed to block 720 where permission may be granted, or consensus confirmed for placement of the associated asset into cache/RAM for an execution instance of the respective game for which the request was made.

Moving on from the description of FIG. 7, another example consistent present principles will now be described. Suppose a cross-platform e-sports tournament is being hosted at a particular location, such as a stadium or other large in-person venue. Also suppose there are different winners for different stages, rounds, or brackets of the tournament and that each winner will be awarded as special digital asset (e.g., trophy) or even blockchain-based currency. In this case, the NFT for the associated digital asset(s) may be transferred from a local datacenter in the stadium to the eventual winner over a local area network, Bluetooth, or near field communication to reduce latency. Then the winner of each stage or round may ante-up the NFT he or she just won to buy in to play the next round or stage of the same tournament, and that NFT may be placed into a virtual escrow account maintained by the tournament host in order to register the respective player for the next round. Then an NFT for the winner of that next round may be minted, where this new NFT for the winner of the next round represents all of the previous NFTs that were used as the buy in. The smart contracts for each respective NFT that was used as a buy in may thus indicate that once aggregated into another NFT for the winner of the higher round, that respective NFT from the lower round is void or no longer has value.

This process may continue through higher and higher rounds of the tournament until one NFT is provided to the eventual winner of the entire tournament, with that NFT encapsulating all lower-round NFTs. Also note that this process may be repeated even if the tournament rounds are not all at the same location, like a city tournament at one location that can be won in order to advance to a nationwide tournament in a different city/location.

As another example incorporating present principles, suppose an end-user is also a digital artist. That person might create a certain skin or other digital content and then mint it into an NFT in a standardized format for use by the person's avatar across all games and platforms adhering to the standard. Thus, the NFT may be used to allow the person to use the skin itself from one game to another and may in a way become the player's "virtual identity" based on the uniqueness of the skin. If desired, the person might also vend or transfer the skin rights to someone else via the NFT, and the original owner/creator may then receive notifications according to the NFT's smart contract that the skin got used somewhere else by a subsequent transferee. The original owner/creator might even receive royalties according to the smart contract for each subsequent transfer and/or use.

As yet another example, an NFT representing reaching a certain level, score, and/or points accumulation in a particular video game may be minted. The NFT may then be transferred to someone else, who may then resume the game where the transferor left off according to the NFT so that the transferee begins gameplay at the same level, with the same score, and/or with the same points accumulation as the transferor.

While the particular embodiments are herein shown and described in detail, it is to be understood that the subject matter which is encompassed by the present invention is limited only by the claims.

What is claimed is:

1. A system comprising:
   at least one server coupled to at least one computer medium via an interface, wherein the computer medium comprises instructions executable by at least one processor to:
   identify using one or more devices a task performed by a first end user entity;
   associate using one or more devices the task with a first non-fungible token (NFT), the task being performed within at least one computer simulation that is displayed on a display device, the first NFT representing a digital asset comprising at least one video game skill applicable by at least a first simulation to a first simulation implement type and applicable by at least a second simulation to a second simulation implement type different from the first simulation implement type; and
   provide the first NFT to a first end-user entity.

2. The system of claim 1, wherein the first end-user entity comprises plural end-users that act in concert to perform the task.

3. The system of claim 1, wherein the first end-user entity comprises a single end-user and no other end-users.

4. The system of claim 1, wherein the task comprises locating the digital asset within the at least one computer simulation.

5. The system of claim 1, wherein the task comprises beating or overcoming a particular aspect of the at least one computer simulation.

6. The system of claim 1, wherein the digital asset comprises one or more of: a video game skin, video game artwork, an avatar, a video game weapon.

7. The system of claim 1, wherein the instructions are executable to:
   one or more of: provide the digital asset to the first end-user entity, maintain the digital asset according to a pointer indicated in the first NFT;
   wherein the digital asset is provided and/or maintained in a standardized format.

8. The system of claim 7, wherein the standardized format is readable to insert the digital asset in different computer simulations, the different computer simulations comprising different video games of different titles.

9. The system of claim 7, wherein the standardized format is readable via different video game platforms, the different video game platforms comprising PlayStation and Xbox.

10. The system of claim 9, wherein the digital asset is usable by the first end-user entity across different video game platforms based on the first end-user entity's ownership of the first NFT.

11. The system of claim 1, wherein the instructions are executable to:
prevent other end-user entities engaging in other instances of the at least one computer simulation from being provided another NFT for performing the task again by removing the digital asset from a virtual location at which the digital asset would otherwise exist in other instances of the computer simulation that are executed.

12. The system of claim 1, wherein the instructions are executable to:
prevent other end-user entities engaging in other instances of the at least one computer simulation from being provided another NFT for performing the task again by preventing performance of the task again in other instances of the computer simulation that are executed.

13. The system of claim 1, wherein the instructions are executable to:
prevent other end-user entities engaging in other instances of the at least one computer simulation from being provided another NFT for performing the task again by declining to provide additional NFTs for subsequent additional performances of the task.

14. A method, comprising:
determining using one or more devices that a first end-user entity has performed a task for which a non-fungible token (NFT) is to be provided, the task being performed within a first computer simulation, the NFT associated with a digital asset; and
responsive to the determining, providing using one or more devices having at least one network interface, the NFT to the first end-user entity, the NFT indicating use rights of the digital asset by the first end-user entity, the digital asset being usable via the NFT by the first end-user entity across plural different computer simulation platforms, the plural different computer simulation platforms comprising at least first and second platforms from respective first and second manufacturers.

15. The method of claim 14, wherein the NFT is a first NFT, and wherein the method comprises:
responsive to the determining, preventing other end-user entities engaging in other instances of the at least one computer simulation from being provided another NFT for performing the task again subsequent to the first end-user entity performing the task.

16. The method of claim 14, wherein the task comprises being the first to locate a representation of the digital asset within the at least one computer simulation and/or being the first across all instances of execution of the at least one computer simulation to take a particular action within the at least one computer simulation.

17. The method of claim 14, wherein the at least one computer simulation comprises a cloud-based video game.

18. The method of claim 14, comprising:
receiving a request from a second end-user entity to use the digital asset in at least one computer simulation, the second end-user entity being different from the first end-user entity;
responsive to receiving the request, verifying via the NFT that the second end-user entity currently holds the use rights for the digital asset; and
responsive to the verifying, permitting use by the second end-user entity of the digital asset in at least one computer simulation.

19. A system comprising:
at least one computer medium that is not a transitory signal and that comprises instructions executable by at least one processor to:
determine using one or more devices that a first end-user entity has performed a task for which a non-fungible token (NFT) is to be provided, the task being performed within a first computer simulation, the NFT associated with a digital asset; and
responsive to the determination, provide using one or more devices and at least one computer network interface configured to communicate with one or more network servers, the NFT to the first end-user entity, the NFT indicating use rights of the digital asset by the first end-user entity, the digital asset being usable via the NFT by the first end-user entity across at least first and second computer simulation platforms made by respective first and second computer simulation console manufacturers.

20. The system of claim 19, wherein the task comprises a victory in an e-sports tournament, wherein the digital asset is usable via the NFT by the first end-user entity across plural different computer simulations, and wherein the plural different computer simulations comprise one or more of: different annual versions of a particular video game title, different video games of different game genres, different execution instances of the same video game.

* * * * *